J. HUEBSCH & R. ROOST.
AUTOMATIC VALVE FOR WASHING MACHINES.
APPLICATION FILED NOV. 24, 1913.
1,223,584.
Patented Apr. 24, 1917.
4 SHEETS—SHEET 3.
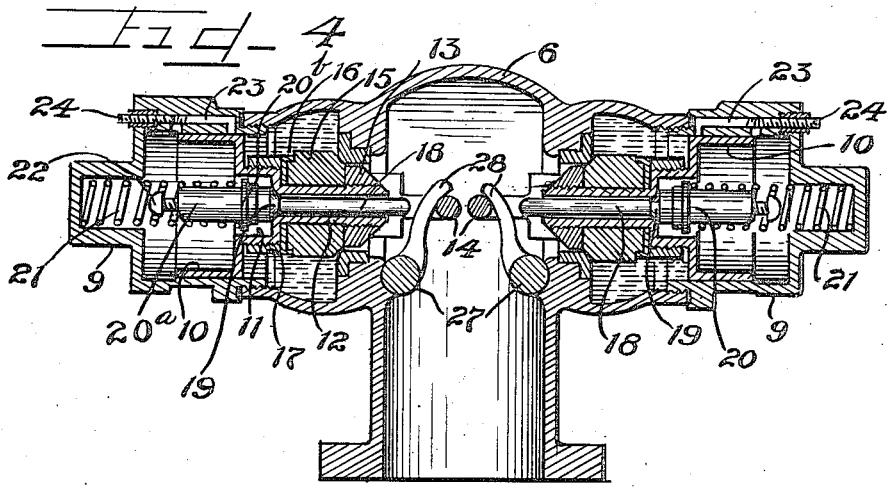
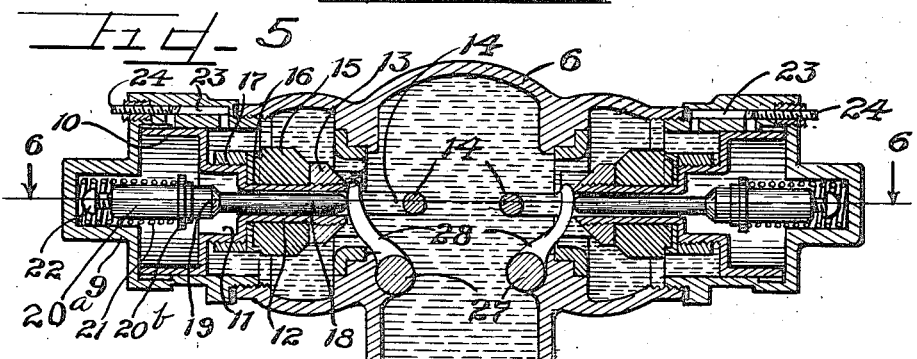
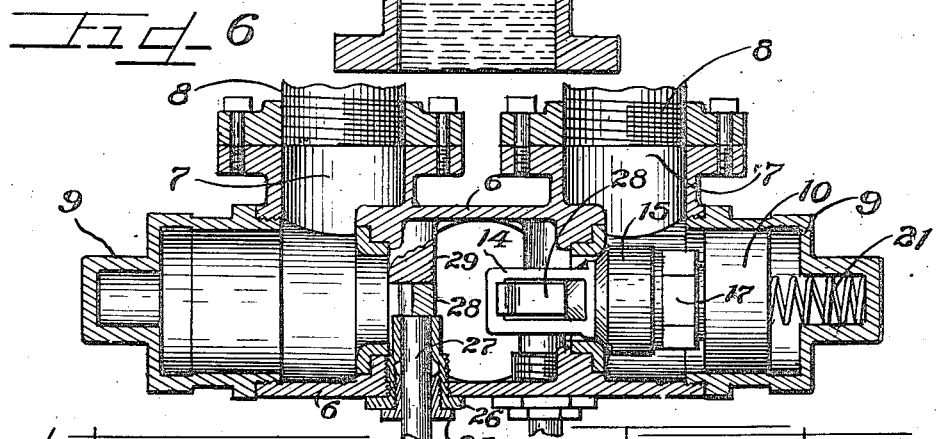
Witnesses:
J. W. Angell
Charles W. Field Jr.
Inventors:
Joseph Huebsch
Richard Roost
by Charles W. Field Atty

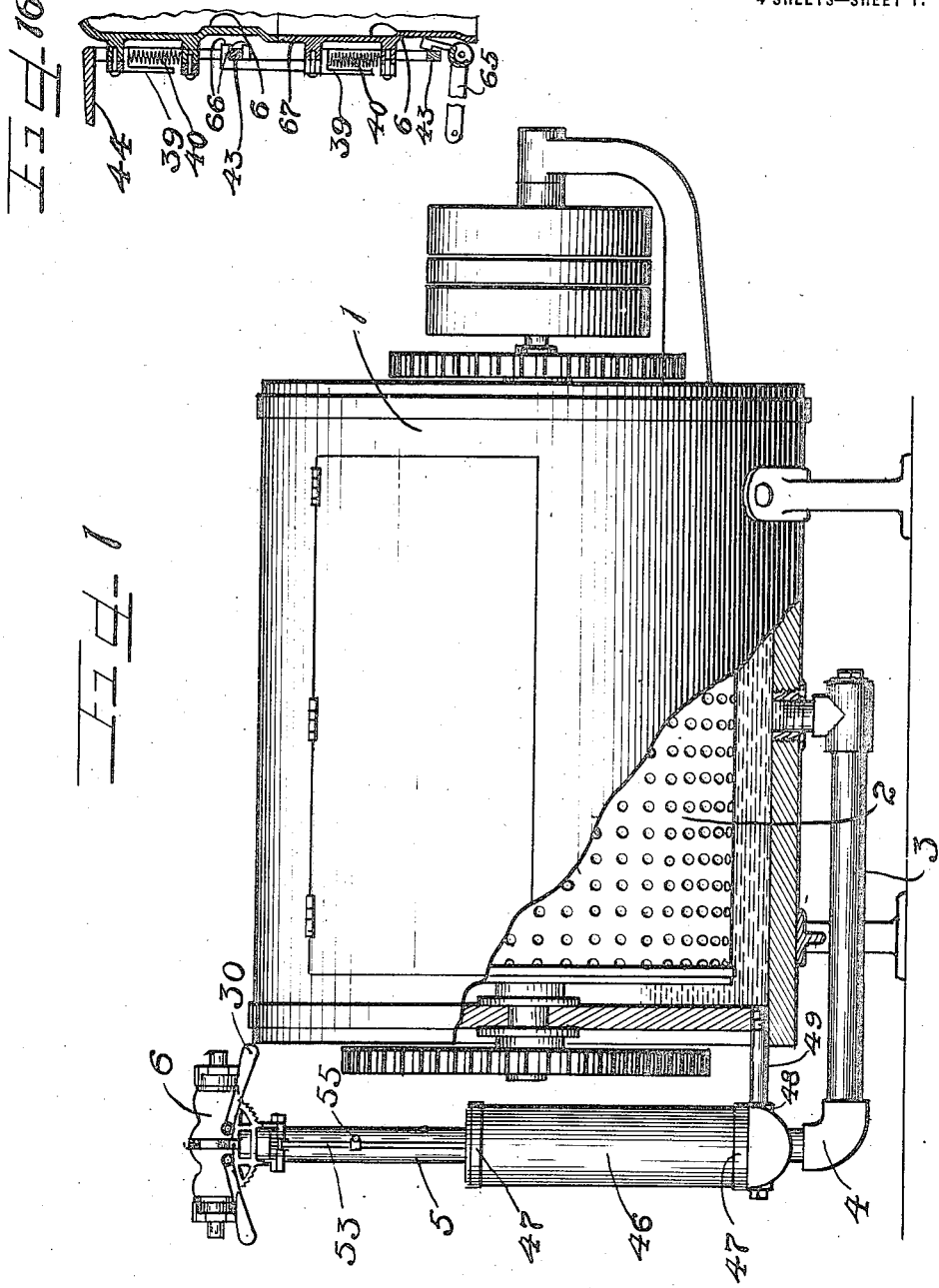

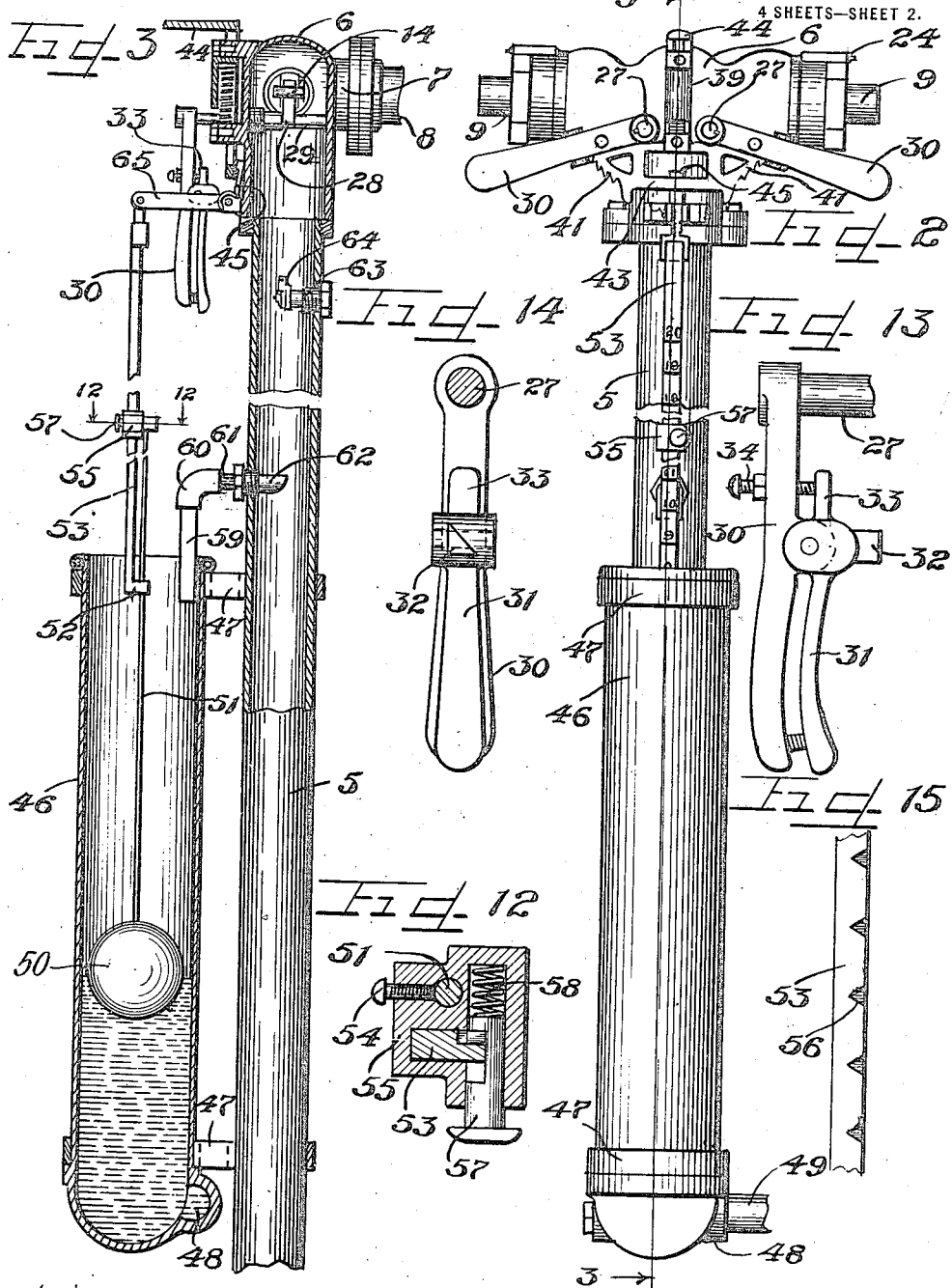

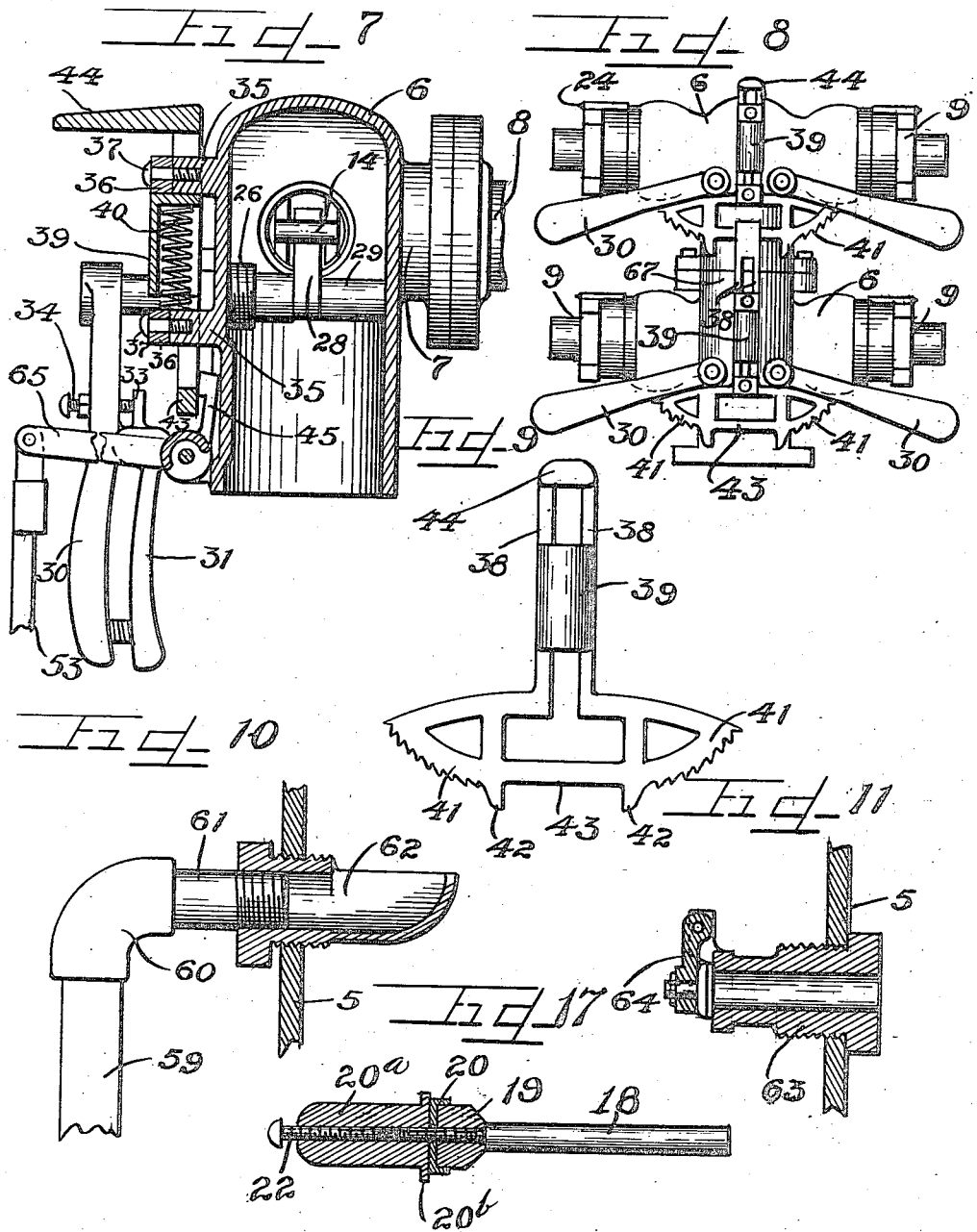

UNITED STATES PATENT OFFICE.

JOSEPH HUEBSCH AND RICHARD ROOST, OF MILWAUKEE, WISCONSIN, ASSIGNORS TO HUEBSCH MANUFACTURING COMPANY, OF MILWAUKEE, WISCONSIN, A CORPORATION OF WISCONSIN.

AUTOMATIC VALVE FOR WASHING-MACHINES.

1,223,584.  Specification of Letters Patent.  Patented Apr. 24, 1917.

Application filed November 24, 1913. Serial No. 802,644.

*To all whom it may concern:*

Be it known that we, JOSEPH HUEBSCH and RICHARD ROOST, citizens of the United States, and residents of the city of Milwaukee, county of Milwaukee, and State of Wisconsin, have invented certain new and useful Improvements in Automatic Valves for Washing-Machines; and we do hereby declare that the following is a full, clear, and exact description of the same, reference being had to the accompanying drawings, and to the numerals of reference marked thereon, which form a part of this specification.

Automatic valves used in connection with washing machines, such as are used in laundries, have been found more or less unsatisfactory in operation after a period of use, owing to the fouling of the mechanisms subjected to the action of the water, which, as a rule, is dirty and soapy. Where such valves have been controlled by float mechanisms the fluid contained in the float chamber flows thereto from the machine, carrying with it of course, the lint from the clothes and particles of soap and dirt, which collect in the float chamber, thus necessitating frequent attention and cleaning of that portion of the mechanism.

This invention relates to automatic float controlled mixing valves, wherein the various valves may be each independently adjusted to an open position to permit an inflowing mixture of fluids, for instance at a certain temperature, and whereby a flow of fluid is maintained from the float chamber to the washing machine, thus insuring clean water at all times in the float chamber and preventing fouling of the same.

It is an object of this invention to construct a device embracing supply valves communicating with a common discharge supply pipe wherein said valves are provided with suitable by-passes for the fluid, which act to admit easy opening of the valve and prevent a sudden closing thereof.

It is also an object of this invention to construct a device embracing supply valves controlled by a float mechanism in which a flow is maintained from the supply pipe through the float chamber to the washing machine with which the float mechanism is connected, insuring clean fluid in the float mechanism at all times.

It is also an object of this invention to construct a device for admitting fluid to a washing machine in regulable quantities and when sufficient fluid has been admitted to the machine to insure an automatic release and closure of the mechanism to shut off the supply of fluid.

It is also an object of this invention to construct a device embracing a plurality of independently operatable and adjustable supply valves associated with float controlling mechanism which may cause actuation of all of said valves.

It is also an object of this invention to construct a device comprising float controlling mechanism for a plurality of independently adjustable supply valves, and wherein the flow from said valves is partially directed to and through the float mechanism.

It is also an object of this invention to provide supply valves for a supply line, so constructed as to permit the ready insertion of other valves in addition, and in a manner whereby a float mechanism is adapted to control the actuation of any and all of the valves independently of the number.

It is also an object of this invention to provide in combination with a plurality of independently operatable valves, an adjustable float controlling mechanism in direct communication with the outlet from said valves.

It is furthermore an object of this invention to provide a valve member having a plurality of inlets, wherein the closures controlling said inlets may be set in any adjusted position, and wherein all of said valves are controlled by float mechanism, acting to instantly release and permit closure of the valves when an excess of fluid passes therethrough into the machine to which the device is attached.

It is finally an object of this invention to construct an automatically acting valve mechanism in which any desired number of mixing valves may be simultaneously and automatically controlled by a single float mechanism to admit predetermined quantities of water to a washing machine.

The invention (in a preferred form) is illustrated in the drawings and hereinafter more fully described.

In the drawings:

Figure 1 is a front elevation of a washing machine partly broken away, and illustrating automatic valves embodying the principles of our invention connected thereto.

Fig. 2 is an enlarged front elevation showing in detail the automatic valve construction.

Fig. 3 is a section on line 3—3 of Fig. 2, with parts in elevation.

Fig. 4 is an enlarged central vertical sectional view showing the valves in closed position.

Fig. 5 is a similar view with the valves in open position.

Fig. 6 is a section taken on line 6—6 of Fig. 5, with parts in elevation, and with parts broken away.

Fig. 7 is an enlarged sectional detail view of the valve as shown in Fig. 3.

Fig. 8 is a modification illustrating four valves associated with one another, illustrating the method of connecting any number of valves in the supply line, if desired.

Fig. 9 is a detail of a slidable toothed member for maintaining the valve levers in adjusted position.

Fig. 10 is a detail partly in section illustrating a cup or open pipe insertible in the supply line.

Fig. 11 is a central vertical section through a conventional type of air check valve, shown inserted in the supply line.

Fig. 12 is a section taken on line 12—12 of Fig. 3.

Fig. 13 is an enlarged side elevation of one of the valve controlling levers.

Fig. 14 is a rear elevation thereof.

Fig. 15 is an enlarged side elevation of a fragment of the float actuating rod.

Fig. 16 is a side view of the connected rack members.

Fig. 17 is an enlarged detail partly in section of the auxiliary valve plunger.

As shown in the drawings:

The reference numeral 1, indicates the casing of a rotary washing machine within which a perforated drum 2, is suitably mounted to receive the clothes to be washed, and to move therein. Inasmuch, however, as the particular construction of the washing machine forms no part of the present invention, the particular details of construction and operation thereof will not be entered into. The water supply for the washing machine communicates therewith at the bottom or at any convenient point through suitable pipe fitting, and preferably embraces a straight portion of pipe 3, extending beneath the washing machine, and connected by means of an elbow 4, to an upstanding or vertical supply pipe 5, which, at its upper end communicates with valve mechanism for controlling the flow of the water supply to the machine.

The valve mechanism comprises a two way or double globular casing 6, the outlet of which is attached to the pipe 5, by means of any suitable pipe coupling, and although only two inlets are shown in the particular construction herein set forth and described, it is obvious that said casing may be formed with additional inlets, for instance, more than two, or, if desired, only one inlet thereto. Inlet passages 7, are provided in the rear side of the casing, and, of course, the source of fluid supply, for instance, hot, cold or treated water, is introduced through different pipes 8, one connected to each of the inlets. Cylindrical caps 9, disposed opposite one another and in axial alinement, are threaded on the casing 6, thus closing the same and affording a chamber containing the valve closures. Inasmuch as the respective operative parts of the valve mechanism are duplications of one another, a description of one will suffice.

This mechanism comprises a cylindrical cup or piston 10, which is reduced in diameter at the portion 11, and further reduced to a relatively long tubular member 12, which is threaded at its end into a bluntly tapered nut 13, having formed integral therewith or secured thereto, as desired, a yoke 14. An annular closure 15, which is chamfered at its end, and may be either metal or rubber composition, as desired, is held in position on the tubular member 12, against a washer 16, by means of the threaded nut 13. Said washer 16, may be set up to further compress the closure 15, by means of an interiorly threaded collar 17, which is engaged on the externally threaded portion 11, of said cup member.

Extending loosely through the tubular portion 12, of the piston 10, is a plunger stem 18, which is of a length, comprising a stem 18, to project slightly beyond the flush ends of the elements 12 and 13. An enlarged conical valve closure 19, adapted to seat against the inner end of said tubular portion 12, is held associated with said stem by means of a long screw 22, projecting therethrough and threaded into said stem. A collar 20, is held against said closure 19, by means of a long internally threaded cylindrical member 20ª, threaded on said screw 22. One end of a spiral compression spring 21, bears against a flange 20ᵇ, on said member 20ª, and the other end thereof seats in a reduced cylindrical portion of the cap 9. Said screw 22, is threaded into the end of said stem and not only provides a lock for the nut, but also affords a means of adjustment to limit the movement of the plungers in the device.

The cap 9, is enlarged on one side thereof, and a passage 23, extends therethrough for a purpose hereinafter described. A plug member 24, is threaded into one end of said passage, said member being adjustable from the exterior of the cap to restrict the area of opening of the passage and limit the flow therethrough, as desired.

Packing gland members 25 and 26, affording a stuffing box, extend through an aperture in the side of the casing and receive therethrough an actuating shaft or rod 27, for the valve closure, said rod having a curved or cam shaped finger 28, which engages within the yoke 14, on said closure. The inner extremity of said actuating rod 27, bears against a boss 29, formed on the interior of the casing. Each of the outer ends of said shafts 27, are provided with a handle 30, to which is pivoted a spring impelled grip 31, having a tooth or projection 32, thereon adapted to engage a rack sector locking means hereinafter described, and also with a tail 33, adapted to bear against a set screw 34, in said handle 30, whereby the amplitude of movement of said grip member may be changed as desired to a predetermined amount.

The degree of opening of the valves is determined, of course, by the amount the levers 30, are moved, and inasmuch as said levers may be retained in any position of movement by said sector locking means, it is obvious that the degree of opening of each or any of said valves may be varied and maintained at predetermined amount optional with the operator.

Said casing 6, on the front side thereof, is provided with a pair of lugs 35, on which squared collars 36, are secured by means of screws 37, to retain and limit the movement of a longitudinally slidable toothed or rack sector member for maintaining the levers 30, in adjusted position. Said rack member comprises vertical parallel bars 38, which engage over the bosses 35, on the casing, and are held slidably thereon by means of said collars 36.

A casing 39, is secured to said bars 38, and incloses a spiral compression spring 40, which bears at its upper end against the upper end of said casing 39, and at its lower end against the lower boss 35. The lower portion of said slidable member is provided with a pair of arc shaped racks 41, having stops 42, at one end thereof and joined by a transverse bar 43. An outstanding arm or grip 44, is provided at the upper end of said slidable member for the purpose of manually thrusting the same downwardly against the compression of the spring 40, and when so thrust downwardly a pawl or trigger 45, pivoted on said casing 6, drops over the bar 43, thus retaining said slidable member in its lower position.

The float controlling mechanism for the valves comprises a vertical cylinder or chamber 46, mounted conveniently adjacent the upright supply pipe 5, and if desired, supported thereon by means of clamps 47. The lower end of said cylinder or chamber 46, is provided with an outlet 48, with which a pipe 49, is connected, said pipe at its other end communicating with the bottom of the washing machine casing, as clearly shown in Fig. 1.

A float 50, is contained within said cylinder 46, and is secured to a rod 51, which extends upwardly in said cylinder, and through an aperture in a lateral extension 52, on the lower end of a graduated actuating rod or bar 53. Said actuating rod 53, is provided with a number of equidistantly spaced recesses 56, conforming to the graduations or scale on the surface of the rod, and a recessed detent 57, impelled by a spring 58, is slidably mounted within said movable adjusting latch 55, to engage in the recesses in said actuating rod 53, and lock the bar 53, and rod 51, together. The scale on the graduated actuating bar 53, may be conveniently in inches to show the level of the fluid in the washing machine casing and float cylinder at which a certain submergence of the float 50, will cause an elevation of the actuating bar and consequent release of the trigger 45.

Projecting into the upper open end of the float cylinder 46, is an open feed pipe 59, which is connected to an elbow 60, threaded on the end of a short pipe 61. The pipe 61, communicates with a hollow plug or cup member 62, which is threaded in turn into the wall of the supply pipe 5, and directed upwardly within the interior of said supply pipe. Thus, as the fluid flows downwardly through the supply pipe, a portion thereof striking the cup member 62, is directed outwardly and through the pipe 59, into the float cylinder 46.

Also threaded into said supply pipe 5, at a point at all times above the level of the fluid in the washing machine, is an automatic air inlet or check valve, comprising a hollow plug member 63, threaded into said supply pipe and normally closed at its inner end by a pivoted gravity acting check or flap 64. The purpose of this valve is to automatically admit air into the supply pipe and to prevent a lowering of pressure therein to an extent less than atmospheric. The upper end of the actuating rod or bar 53, is pivotally connected to an arm 65, which is rigidly connected to, or may be formed integral with, the pawl or trigger 45, so that actuation of said arm will cause movement of the trigger.

The operation is as follows:

Mechanism acts automatically to shut off the supply of fluid to the washing machine when the level of the fluid therein rises to the predetermined height in the casing. This is accomplished by means of the float 50, contained within the cylinder 46, and adjustably connected to the actuating rod 53, by means of the latch 55, and stem 51, already described. As the fluid within the washing machine and in the float cylinder rises to a predetermined level determined by the adjustment of the float mechanism, the float will be elevated, and due, to the consequent upward movement of the bar 53, raising the arm 65, will cause a retraction of the pivoted pawl or trigger 45, and a release of the slidable rack member under the impulse of the spring 40. When the valve levers 30 are released by release movement of said slidable rack member, the valves operate to close under the impulse of their respective springs 21.

The respective valves are constructed to open easily when the handle is actuated, and to close slowly under the impulse of the spring in the valve casing when the handle of the valve is released. This is effected by the auxiliary passage 23, the opening and closing of one end of which is controlled by movement of the piston 10. Referring to Fig. 4, where the valves are in closed position, the inner end of said passage 23, is closed by the piston and as the handle of the valve is moved, the stem 18, is first moved by the finger 28, thus retracting the valve closure 19, from its seat and with a further movement of said finger 28, the sealing element of the main valve closure 15, is moved from its seat and of course the piston 10, therewith. Owing to the fact that the valve closure 19, is in open position no augmentation of pressure in the space within the piston 10, can take place, and in fact it will be found that the fluid will flow into the passage 23, at the inner end thereof as the piston 10, moves to open the same, and outwardly through the outer end of said passage, and thence around and within the piston, and finally outwardly through the tubular element 12, so that in effect, a balancing of the valve is obtained.

When the handle 30, of the valve is released of course the closure 19, immediately seats and as the main valve closure moves toward closed position, the inner end of the passage 23, is closed by the piston 10, and a reduction in pressure is effected in the space between the cap 9, and said piston, to thus retard the closing of the valve. Of course, the piston 10, does not fit tightly within the cap 9, and the fluid may seep past the periphery thereof so that in time an equalization of pressure will have taken place and the space between the piston 10, and cap 9, will be filled with the fluid. However, as pointed out, during the actual closing of the valve, the seepage past the cup member 10, is so small as to permit a reduction of pressure to take place and a consequent retardation of movement of the valve into closing position.

In the modification illustrated in Figs. 8 and 16, we have shown two double entrance valves connected to one another, and controlled by a pair of connected slidable rack members provided with the sector racks for the levers, as already described. In this construction all four valves are controllable by means of the float, as before, the only difference being in the construction of the lower slidable member. In the latter case said member in place of the actuating grip 44, is provided with an extended end having a pair of inwardly directed lugs 66, which engage the transverse bar 43, of the upper slidable member and is constrained thereby to move therewith at all times.

We believe from the construction described, it is obvious that any desired number of supply valves may be connected to deliver from the main supply pipes and into the casing. For this purpose the casings are provided with an upper inlet, as indicated at 67, in Fig. 8, and connected substantially at 67, in Fig. 8, and connected substantially in train one upon another, the uppermost, of course, having a casing closed at the top. Any desired number or all of the valves may be adjusted to any desired degree of opening respectively, and will be retained in the adjusted open position by means of the respective rack segments until the supply of fluid within the casing and float cylinders shall have reached the level for which the flow is set by means of the graduated actuating bar whereon the float is suspended from the arm 65. Immediately upon the fluid rising to the predetermined level (as indicated by the setting of the latch on the graduated actuating bar) the buoyancy of the float causes an elevation of the same, and said arm 65, releases the trigger. This, from the construction before described, releases all of the rack segments to move upwardly under the impulse of their respective compression springs instantaneously releasing all the valve levers and permitting the valves to close as hereinbefore described.

Obviously, from the construction described, a supply of fluid from the main supply pipe 5, is delivered directly into the float cylinder through the pipe 59, while the casing is filling. The amount of fluid so delivered into the float cylinder is sufficient to insure against any back flow from the casing into the float chamber under any condition, so that the float chamber is therefore at all times free from contamination from dirty water or lint, considerable quantities of which might otherwise accumulate therein.

We are aware that the details of construction may be varied through a wide range without departing from the principles of this invention. We therefore do not purpose limiting the patent granted otherwise than necessitated by the prior art.

We claim as our invention:

1. In a device of the class described a casing, a plurality of main valves mounted end to end therein and communicating with a common outlet, auxiliary valves axially alined therein, piston valves connected with said main valves and operatable therewith, passages in said casing controlled by said piston valves, means for regulating the area of opening of said passages, mechanism for setting one or more of said valves independently in an adjusted open position, and means for automatically releasing all of said open valves to closed position after a predetermined flow therethrough.

2. In a device of the class described a casing, valve seats therein, a plurality of automatically closing valves alined therein and adapted to move toward one another to closed positions in said valve seats and communicating with a common outlet, means on said casing adjustable from the exterior thereof to govern the closing movement of said valves, auxiliary valves connected in said main valves to open prior to the opening of said main valves and to close prior to the closing thereof, and means determined by the quantity of the discharge for automatically releasing all of said valves simultaneously when in open position to permit closure thereof.

3. In a device of the class described valve casings mounted end to end, a plurality of valves therein communicating with a common outlet, auxiliary valves mounted within said valves to open prior to the opening of said valves, and to close prior to the closure thereof, a piston and dash pot connected with said first mentioned valves, a release passage for said dash pot communicating around said first mentioned valves, and permitting easy opening of said first mentioned valves when said auxiliary valves are first opened and retarding the closure of said first mentioned valves after said auxiliary valves are closed.

4. In a device of the class described a casing, valve seats alined therein, a plurality of independently operable valves axially alined in said casing with the valve seat ends of said valves adapted to move toward one another to engage in said valve seats and communicating with a common outlet thereof, manually operated actuating means operated independently for each of said valves, locking means therefor, acting to hold said valves in adjusted open positions, auxiliary valve passages formed in the walls of said casing acting to equalize the pressure on each side of said valves, and a float acting to release said locking means therefrom to permit automatic closing of the valves at a predetermined flow therethrough, and graduated adjusting means for the float.

5. A device of the class described embracing independent sources of fluid supply, an independent valve for each acting to control the flow therefrom, a piston forming a part of each of said valves, passages for equalizing the pressure on each side of said valves the opening and closing of which are controlled by said piston, a yoke formed on each of said valves, mechanism engaged in said yokes for locking said valves in adjusted open position, said valves alined with the yoked ends adjacent one another, a receptacle to receive the flow, an independent float tank supplied from said valves independently of the receptacle and communicating to discharge freely thereto, a float adjustably supported in said tank and mechanism operated by the float to release the valves to closed position when the level of the liquid in the receptacle reaches a predetermined height.

6. In a device of the class described the combination with a washing machine, of a supply line connected thereto, casings mounted end to end therein, axially alined independent supply valves in said casings adapted to be independently adjusted to predetermined open positions to admit a certain mixture of fluid to the machine, exteriorly adjustable means acting to equalize the pressure on each side of said valves, automatic means connected to the washing machine and to said valves to permit closure of the valves when the level of fluid in said washing machine rises to a predetermined height, and connections between said float chamber, said supply line and said washing machine to maintain a flow of fluid from the float chamber to said washing machine.

7. In a device of the class described the combination with a washing machine, of a casing connected therewith, a main supply pipe leading thereto, a plurality of supply valves mounted end to end in said supply pipe to control quantities of different fluids therethrough, passages formed in the walls of said casing adapted to equalize the pressure on each side of said valves, automatic means admitting air to said main supply pipe to prevent lowering of the pressure in said supply pipe below atmospheric, automatic float controlled means communicating with said washing machine adapted to release said valves to closed position when the level of the fluid in the washing machine rises to a predetermined amount, and means supplying fluid to said automatic means from said supply pipe to insure a flow of fluid from said automatic means to the washing machine.

8. In a device of the class described the combination with a washing machine, of a main supply pipe leading thereto, automatic float mechanism communicating with said washing machine, independently operatable valves mounted end to end on said supply pipe to control the flow of fluid thereinto, an outlet chamber between said valves, valve control mechanism within said chamber, an adjustable connection between said float mechanism and said valves whereby the open valves are released to closed position when the level of the fluid in the washing machine rises a certain amount, and a graduated scale forming a part of said adjustable connection whereby the float mechanism may be set for different levels of fluid in the washing machine.

9. In a device of the class described a plurality of valve casings connected end to end in a main supply lead, a plurality of valves in each of said casings, each valve independently operatable into open position, a plurality of connected locking members arranged to insure simultaneous movement of each of said locking members with the movement of any one thereof, and actuating levers for said valves adapted to be maintained in an adjusted open position by said locking members.

10. The combination with a washing machine having a main supply line, of independently operatable supply valves connected to discharge to said supply line, manually actuatable means connected to operate said valves, a member for maintaining said means in an adjusted position, float mechanism adapted to receive a supply of fluid directly from said supply line and communicating with other supply valves adapted to be connected in train with said first mentioned valves and discharging also to said supply line, manually actuatable means for operating said second mentioned valves, a second member adapted to be engaged to said first mentioned member to insure simultaneous movement of said first and second means, coöperative connections between the float mechanism and one of said members whereby when a certain quantity of fluid is admitted to the washing machine, said valves will be released from said members by said float mechanism permitting closure of all of the open valves, and exteriorly adjustable auxiliary controls adapted to equalize the pressure on each side of said first and second mentioned supply valves.

11. In a device of the class described the combination with a washing machine of a fluid supply line leading thereto, float mechanism connected to receive fluid therefrom, an outlet for said float mechanism leading to the washing machine, sets of interfitting automatically closing fluid supply valves mounted in said supply line with the valves in each set mounted end to end to discharge fluid thereto, a piston forming a part of each of said valves, passages for equalizing the pressure on each side of said valves the opening and closing of which are controlled by said piston, connections between said float mechanism and said valves whereby an excess of fluid admitted to said washing machine causes release of all of the open supply valves to closed position, and means acting automatically to admit air to said supply line to prevent a reduction of pressure therein below atmospheric.

12. In a device of the class described a receptacle, a main supply line for said receptacle, a plurality of valve casings connected end to end therein, automatically closing valves in said casings each connected with an independent source of supply for controlling the flow of fluid thereto, piston controlled valves for equalizing the pressure on each side of said valves, float mechanism communicating with said supply line, and with said receptacle, connections between said float mechanism and said valves whereby the open ones of said valves may be released to closed position when a certain quantity of fluid has been admitted to said receptacle, and automatic means for admitting air to said supply line.

13. In a device of the class described a supply line, a plurality of independently operatable automatically closing valves connected therein, levers for manually and independently actuating each of said valves into open position, slidable locking means associated with said valves to maintain the same in adjusted open position, other independently operatable automatically closing valves adapted to be connected to said first mentioned valves and to said supply line, manually independently actuatable levers for each of said second mentioned valves, locking means for said second mentioned valves to maintain the same in adjusted open position, mechanism on said second mentioned locking means to releasably engage said first mentioned locking means to insure simultaneous movement of both of said locking means, float controlled mechanism connected to one of said locking means to release said locking means and cause release of all of the open valve levers permitting closure of all of said valves, and auxiliary valves axially alined with each of said first and second mentioned valves adapted to simultaneously operate to equalize the pressure on each side of said first and second mentioned valves.

14. In a device of the class described the combination with a supply line of axially alined automatically closing valves to control the admission of fluid thereto from separate sources of fluid supply, controlling passages associated with said valves adapted to equalize the pressure on each side of said valves, independent actuating means, one for each of said valves, a locking member normally impelled to unlocking position and movable into locking position to engage said actuating means to lock the valves in an adjusted open position, mechanism for retaining said locking member in locking position, actuating mechanism for releasing said locking member to permit closure of the valves, a graduated member connected thereto, float mechanism, and means adjustably connecting said float mechanism with said graduated member whereby the release of said locking member may be predetermined in accordance with an amount of fluid admitted by said valves to the supply line.

15. In a device of the class described the combination with a washing machine, of a plurality of valve casings connected end to end in a main supply lead, a plurality of axially alined valves in each of said casings, each of said valves connected to a different source of liquid supply, an outlet chamber common to all of said valves forming the supply main, a plurality of locking mechanisms, one associated with each of said valve casings to lock the valves in an adjusted open position, all of said mechanisms adapted to operate when any one thereof is actuated, and float controlled means adapted to move said locking members to release the valves to closed position.

16. In a device of the class described a casing formed to afford alined inlet passages and a central outlet passage, independently operatable axially alined valves controlling the flow through said respective inlet passages into said outlet passages, actuating means for each of said valves mounted in the outlet passage, and axially alined auxiliary valves in each of said first mentioned valves operatable by said actuating means.

17. In a device of the class described the combination with a main supply line for a washing machine, of a casing, automatically closing independently operatable yoked valves mounted end to end in said supply line, by-passes formed in said casing, means for varying the area of opening of said by-passes to control the pressure on each side of said valves, a float mechanism adapted to cause release of said valves to closed position when an excess of fluid flows to the washing machine, means admitting fluid to said float mechanism from said supply line, an outlet connected in said float mechanism and communicating with the washing machine, whereby a flow is maintained from the float mechanism to the washing machine, and means admitting air to said supply line to prevent a reduction of pressure therein.

18. In a device of the class described a receptacle, a casing, a plurality of automatically closing valves mounted end to end therein communicating with a common outlet leading to said receptacle, means on said casing adjustable from the exterior thereof to govern the closing movement of said valves, actuating levers, one for each of said valves to open each valve independently of the others, locking means on said levers, a movable rack member adapted to normally engage the locking means on said levers to retain the valves in an adjusted open position, float mechanism, operating mechanism controlled thereby adapted to release said movable member to release said locking means and permit closure of the valves when a predetermined quantity of fluid has flowed to said receptacle, communication between said float mechanism and said receptacle, and means preventing a flow of fluid from the receptacle to said float mechanism.

In testimony whereof we have hereunto subscribed our names in the presence of two subscribing witnesses.

JOSEPH HUEBSCH.
RICHARD ROOST.

Witnesses:
LAWRENCE REIBSTEIN,
GEORGE R. MOORE.